United States Patent [19]

Cenky

[11] Patent Number: 4,808,965

[45] Date of Patent: Feb. 28, 1989

[54] THERMAL PROTECTOR

[75] Inventor: Mark A. Cenky, Lexington, Ohio

[73] Assignee: Therm-O-Disc, Incorporated, Mansfield, Ohio

[21] Appl. No.: 118,022

[22] Filed: Nov. 6, 1987

[51] Int. Cl.$^4$ .................... H01H 37/76; H01H 85/00
[52] U.S. Cl. ........................................ 337/408; 337/1; 337/4
[58] Field of Search ........................................ 337/1-6, 337/401-409; 361/24; 219/511, 504, 505; 338/225 D, 23

[56] References Cited

U.S. PATENT DOCUMENTS

| 3,519,972 | 7/1970 | Merrill | 337/403 |
| 4,096,464 | 6/1978 | Dennis et al. | 337/5 |
| 4,306,210 | 12/1981 | Saur | 337/2 |

Primary Examiner—H. Broome
Attorney, Agent, or Firm—Jones, Day, Reavis & Pogue

[57] ABSTRACT

A thermal protector including a thermal cutoff and a device having a positive temperature coefficient of resistance, both mounted in a common housing and connected in series.

10 Claims, 1 Drawing Sheet

THERMAL PROTECTOR

BACKGROUND OF THE INVENTION

This application relates to the art of thermal protectors and, more particularly, to thermal protectors used in electric circuits. The invention is particularly applicable to thermal cutoffs and PTC devices, and will be described with particular reference thereto. However, it will be appreciated that the invention has broader aspects, and that components other than thermal cutoffs and PTC devices can be used.

One common type of thermal protector is known as a thermal cutoff, and includes a pellet that melts at a predetermined temperature to open a pair of contacts and interrupt a circuit.

Another known type of thermal protector is a device made of a material having a positive temperature coefficient of resistance, also known as PTC device. Within a certain narrow temperature range, the electrical resistance of such devices jumps sharply, and substantially switches off current to the system being protected.

For certain purposes, it is desirable to have the protection of both a thermal cutoff and a PTC device. Therefore, it would be desirable to have a unitary package incorporating both types of thermal protectors. This would allow rapid and economical installation of only one assembly in a circuit, while affording dual protection by both thermal protectors.

SUMMARY OF THE INVENTION

A thermal protector for electric circuits includes a pair of independent thermal responsive devices connected in series. One device is responsive to elevated temperatures by increasing in resistance. The other device is responsive to elevated temperatures by opening a circuit. The one device is responsive to temperatures lower than the other device.

In a preferred arrangement, the one device that is responsive to elevated temperatures by increasing in resistance is made of a material having a positive temperature coefficient of resistance, and is known as a PTC device or a PTC material. The other thermal responsive device is a thermal cutoff containing a pellet of an organic chemical that melts at a predetermined temperature to allow opening of normally closed contacts.

The two thermal responsive devices are in a common housing so that connection of both devices in a circuit is accomplished by installing one unitary assembly.

It is a principal object of the present invention to provide an improved thermal protector that provides dual protection in a unitary assembly.

It is also an object of the invention to provide an improved thermal protector that is very compact, and economical to manufacture and install.

It is a further object of the invention to provide an improved thermal protector having one automatically resettable thermal device and another nonresettable thermal device that operates subsequent to the resettable thermal device.

DESCRIPTION OF A PREFERRED EMBODIMENT

Figures 1, 2:
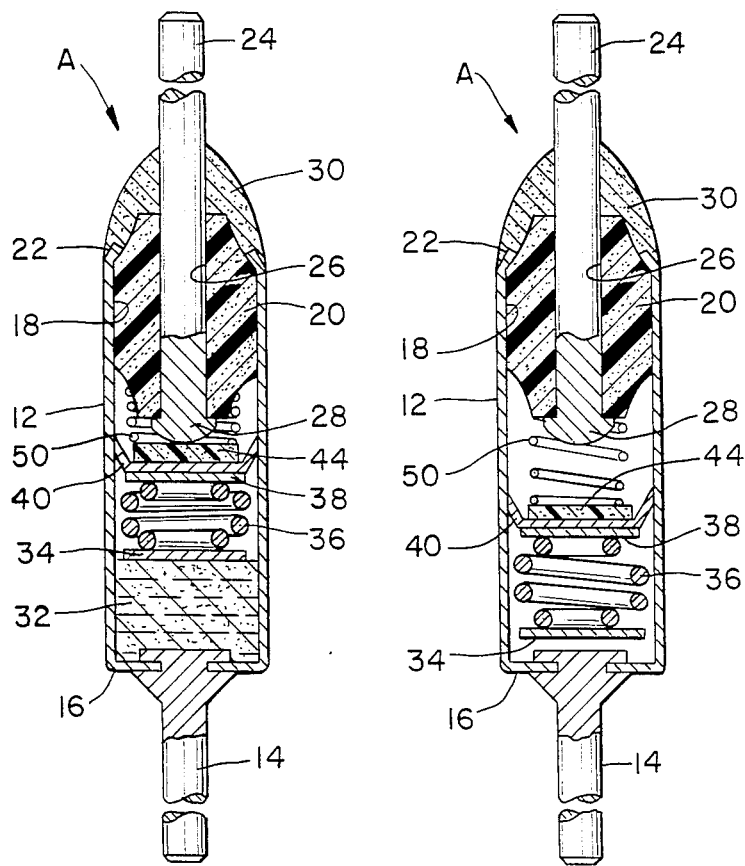
FIG. 1 is a cross-sectional elevational view of a thermal protector constructed in accordance with the present application.
FIG. 2 is a view similar to FIG. 1 and showing a pair of normally closed contacts in an open position.

Referring now to the drawing, wherein the showings are for purposes of illustrating a preferred embodiment of the invention only, and not for purposes of limiting same, an improved thermal protector A is constructed to provide dual thermal protection in one unitary assembly.

An elongated cup-like cylindrical metal housing 12 has a wire lead 14 suitably secured to one end 16 thereof in a known manner. The opposite internal end portion of housing 12 has a cylindrical recess 18 therein of a larger diameter than the remaining cylindrical interior of housing 12.

A dielectric bushing 20 of ceramic or the like is closely received in recess 18. The terminal end portion 22 of housing 12 is turned inwardly for securing bushing 20 within recess 18.

A second wire lead 24 is received through a central cylindrical hole 26 in bushing 20, and has an enlargement 28 thereon inside of housing 12 to define a fixed electrical contact. A suitable sealing compound 30, such as epoxy or the like, is placed in surrounding sealing relationship with lead 24, bushing 20 and housing terminal end portion 22.

FIG. 1 shows a thermal pellet 32 of an organic chemical that melts at a predetermined temperature. Many different organic chemicals are used in thermal cutoffs of this type, and the different organic chemicals have different melting points so the thermal cutoff can be designed to operate at a predetermined temperature. Typical examples for the organic chemical are caffeine and animal protein. Thermal pellet 32 is received within housing 12 and seated against the interior of housing end 16.

A metal disc 34 rests against thermal pellet 32. A first coil spring 36 is in a compressed condition in FIG. 1 between disc 34 and another disc 38.

A metal star contact 40 rests against metal disc 38. Star contact 40 has a plurality of circumferentially-spaced outwardly inclined resilient fingers that resiliently engage the interior wall of housing 12 in conductive sliding relationship therewith.

A PTC disc is carried by movable star contact 40, and is positioned between movable star contact 40 and fixed contact 28. PTC disc 44 can be a conductive polymer having a particulate conductive filler such as carbon black. However, other types of PTC material can be used, including a doped ceramic such as barium titanate. A PTC device exhibits a non-linear change in resistance with temperature. Within a certain narrow temperature range, the electrical resistance of a PTC device jumps sharply. A PTC device may be customized to respond to either temperature conditions of the surrounding environment or to current overload conditions.

In a typical application, a PTC device is connected in series with the circuit components requiring protection. In the event of an overload condition in the system, the PTC device will reach switching temperature either by self-induced heating ($I^2R$) from the current passing through it or by sensing excessive ambient temperatures. At this point, the PTC device switches into its high resistance state, and effectively blocks the flow of current. A minimal amount of current will persist (trickle current), which holds the PTC device in its high resistance state. Once the power source has been interrupted, and the abnormal condition corrected, the PTC device will return to its rated conductive state, ready to protect the system once again. The opposite flat faces of PTC disc 44 can have metal foil or mesh discs, such as nickel, bonded thereto or embedded therein.

A second coil spring 50 acts between bushing 20 and PTC disc 44. The biasing strength of second coil spring 50 is less than the biasing strength of first coil spring 36 under the conditions shown in FIG. 1 so that PTC disc 44 is held firmly in engagement with fixed contact 28.

Under the conditions shown in FIG. 1, a continuous conductive path is established between leads 14, 24. This conductive path is from lead 14, to conductive housing 12, to movable star contact 40, to PTC disc 44, and to fixed contact 28 on lead 24. Under normal operating conditions, this conductive path is uninterrupted. In the event the design temperature of PTC disc 44 is reached, it will automatically switch into its high resistance state, and only a trickle current will pass through it to the system being protected. In the event the conditions which caused the high temperature are corrected, PTC disc 44 will automatically reset by switching back to its normal conductive condition. Thus, under conditions where a certain design temperature is exceeded, but does not necessarily indicate a complete failure of the system, PTC disc 44 allows protection while providing automatic resetting.

In the event the condition that caused the excessive temperature remains uncorrected, and the temperature continues to rise, the thermal cutoff part of the protector will operate to completely interrupt the circuit. Under such conditions, thermal pellet 32 of FIG. 1 will melt and thereby allow first spring 36 to expand. Expansion of first coil spring 36 as shown in FIG. 2 results in the biasing force of second coil spring 50 becoming greater than the biasing force of first spring 36. Therefore, PTC disc 44 and star contact 40 move away from fixed contact 28 to completely interrupt the circuit. The circuit will remain open until thermal protector A is replaced or bypassed.

The arrangement of the present application provides dual-type of thermal protection with one unitary assembly. The PTC disc operates at a first temperature substantially below the operating temperature of the thermal cutoff. PTC disc 44 protects the circuit by switching to a high resistance state and automatically resets if the temperature goes back down. However, the thermal cutoff permanently interrupts the circuit by melting of thermal pellet 32.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A thermal protector comprising a pair of independent thermal responsive devices connected in series, one of said pair of devices being responsive to elevated temperatures by increasing in resistance, the other of said pair of devices being responsive to elevated temperatures by opening a circuit, said one device being responsive to temperatures lower than said other device, said other device having a pair of separable contacts that move relatively away from one another when said other device is activated in response to elevated temperatures, and said one device being interposed between said contacts.

2. The thermal protector of claim 1 wherein said pair of devices are in a common housing.

3. The thermal protector of claim 1 wherein said pair of separable contacts includes at least one movable contact, and said one device being movable with said movable contact.

4. The thermal protector of claim 1 wherein said one device comprises a PTC disc.

5. A thermal protector having a pair of electrical contacts, said pair of contacts being closed at normal operating temperatures and being open at abnormal operating temperatures, PTC means interposed between said pair of contacts for reducing current flow between said pair of contacts at elevated temperatures lower than said abnormal operating temperatures, at least one of said pair of contacts being movable toward and away from the other, and said PTC means being movable with said one movable contact.

6. The thermal protector of claim 5 wherein said PTC means comprises a disc.

7. The thermal protector of claim 5 wherein said contacts and said PTC means are enclosed in a common housing.

8. A thermal protector comprising a pair of independent thermal responsive devices connected in series, one of said pair of devices being responsive to elevated temperatures by increasing in resistance, the other of said pair of devices being responsive to elevated temperatures by opening a circuit, said one device being responsive to temperatures lower than said other device, and said other device including a meltable thermal member positioned in spaced relationship to said one device.

9. A thermal protector comprising a pair of independent thermal responsive devices connected in series, one of said pair of devices being responsive to elevated temperatures by increasing in resistance, the other of said pair of devices being responsive to elevated temperatures by opening a circuit, said one device being responsive to temperatures lower than said other device, and said other device including a noncurrent carrying meltable thermal member.

10. The thermal protector of claim 9 wherein said other device includes a pair of separable contacts, first biasing means for biasing said contacts into engagement when said meltable thermal member is solid, and second biasing means operative when said meltable thermal member melts for biasing said contacts apart.

* * * * *